(12) United States Patent
Lape et al.

(10) Patent No.: US 8,495,929 B2
(45) Date of Patent: Jul. 30, 2013

(54) LEAD CONNECTION AND ALIGNMENT TOOL

(75) Inventors: Brock M. Lape, Clifton Park, NY (US); Jeffrey D. Evans, Earlton, NY (US)

(73) Assignee: General Electric Company, Schenectady, NY (US)

( * ) Notice: Subject to any disclaimer, the term of this patent is extended or adjusted under 35 U.S.C. 154(b) by 671 days.

(21) Appl. No.: 12/649,423

(22) Filed: Dec. 30, 2009

(65) Prior Publication Data
US 2011/0154579 A1 Jun. 30, 2011

(51) Int. Cl.
*B21F 1/00* (2006.01)
*B21D 7/00* (2006.01)
*B21D 11/00* (2006.01)

(52) U.S. Cl.
USPC .............. 81/25; 81/26; 81/487; 81/20; 81/21; 279/79; 72/458; 72/477

(58) Field of Classification Search
USPC .............. 81/25, 26; 7/143, 146, 147; 72/308, 72/310, 311, 298, 299, 477, 478, 481.1
See application file for complete search history.

(56) References Cited

U.S. PATENT DOCUMENTS

| | | | | |
|---|---|---|---|---|
| 974,021 A | | 10/1910 | Blake | |
| 1,121,085 A | * | 12/1914 | Fitzgerald | 81/25 |
| 1,303,090 A | * | 5/1919 | McCray | 30/308.3 |
| 1,807,347 A | * | 5/1931 | Schweigert | 81/25 |
| 2,833,323 A | * | 5/1958 | Strickland | 81/25 |
| RE24,831 E | * | 5/1960 | Livermont | 81/177.85 |
| 2,938,412 A | | 5/1960 | Walker | |
| 4,234,987 A | * | 11/1980 | Charette | 7/139 |
| 4,924,576 A | * | 5/1990 | Schiller | 30/358 |
| 5,216,939 A | * | 6/1993 | Swenson | 81/25 |
| 5,255,575 A | | 10/1993 | Williams | |
| 5,526,719 A | * | 6/1996 | Chen | 81/25 |
| 6,347,562 B1 | * | 2/2002 | Gerber, Jr. | 81/25 |
| 6,463,832 B1 | * | 10/2002 | Cox | 81/22 |
| 6,536,308 B1 | * | 3/2003 | Thorne et al. | 81/20 |
| 6,564,681 B2 | * | 5/2003 | Coulter | 81/487 |
| 6,655,236 B1 | | 12/2003 | Slack et al. | |
| 6,928,899 B1 | * | 8/2005 | Lin | 81/25 |
| 2003/0229945 A1 | * | 12/2003 | McAbee | 7/144 |
| 2006/0144195 A1 | | 7/2006 | Tanga | |

\* cited by examiner

*Primary Examiner* — Monica Carter
*Assistant Examiner* — Melaine Alexander
(74) *Attorney, Agent, or Firm* — James W. Pemrick; Ernest G. Cusick; Frank A. Landgraff

(57) ABSTRACT

A tool for applying a bending or impact load to one or more conductors in a dynamoelectric machine is provided. The tool includes an elongate, substantially tubular handle having an opening at a first end, a second end opposed to the first end, and the handle has a handle axis. A head is connected to the second end of the handle, and includes a striking surface for applying impact loads, and an interchangeable tool socket located opposite to the striking surface. The head has a head axis oriented orthogonal to the handle axis. The interchangeable tool socket can accept one of a plurality of tool inserts and the tool inserts may be rotated generally around the head axis and locked in at least one position within the interchangeable tool socket so that the angle of each tool insert can be adjusted to user preferences.

18 Claims, 8 Drawing Sheets

LEAD CONNECTION AND ALIGNMENT TOOL

BACKGROUND OF THE INVENTION

The present invention relates to new or existing electrical power producing generators and particularly relates to a tool for use in aligning and bending the leads for the stator, rotor and other elements in the generator.

Electrical generators typically comprise a plurality of stator bars disposed in slots in a stator core. As well known, each stator bar is generally comprised of a plurality of individual electrically conductive strands. Each stator bar has opposite end sections which are twisted and extend in a generally circumferential conical direction. Each end section is connected, for example by brazing, to another stator bar to complete an electrical circuit in at least one phase about the stator. Sections of the stator bars intermediate the end sections are generally rigid and extend linearly. The ends of the stator bars, oftentimes called end windings, may index conically clockwise or counterclockwise as the ends extend from the stator core and twist from the linear intermediate section. The end windings define unique shapes at opposite ends of each stator bar for each different type of generator. The main leads may also need to conform to specific shapes to properly connect the bore copper to the field coil end windings. The process to obtain these unique or specific shapes (e.g., bends of specific angles, conductors bent at specific locations, etc.) is time consuming and laborious. Many different tools and jigs are required to obtain specific shapes for the various conductors in generators.

BRIEF DESCRIPTION OF THE INVENTION

Briefly and in accordance with one aspect of the present invention, a tool for applying a load to one or more conductors in a dynamoelectric machine is provided. The tool includes an elongate, substantially tubular handle having an opening at a first end, a second end opposed to the first end, and the handle has a handle axis. A head is connected to the second end of the handle, and includes a striking surface for applying impact loads, and an interchangeable tool socket located opposite to the striking surface. The head has a head axis oriented orthogonal to the handle axis. The interchangeable tool socket can accept one of a plurality of tool inserts and each tool insert may be rotated generally around the head axis and locked in at least one position within the interchangeable tool socket so that the angle of each tool insert can be adjusted to user preferences.

In accordance with another aspect of the present invention, a tool for applying a bending or impact load to one or more conductors in a dynamoelectric machine is provided. The tool includes an elongate, substantially tubular handle having an opening at a first end, a second end opposed to the first end, and the handle has a handle axis. A head is connected to the second end of the handle, and includes a striking surface for applying impact loads, and an interchangeable tool socket located opposite to the striking surface. The head has a head axis oriented orthogonal to the handle axis. The interchangeable tool socket can accept one of a plurality of tool inserts and each tool insert may be rotated generally around the head axis and locked in at least one position within the interchangeable tool socket so that the angle of each tool insert can be adjusted to user preferences.

DETAILED DESCRIPTION OF THE INVENTION

While the present invention is applicable to stator or rotor rewinds in existing generators it may also find utility in stator/rotor winding installation in new generators as well.

Figure 1:
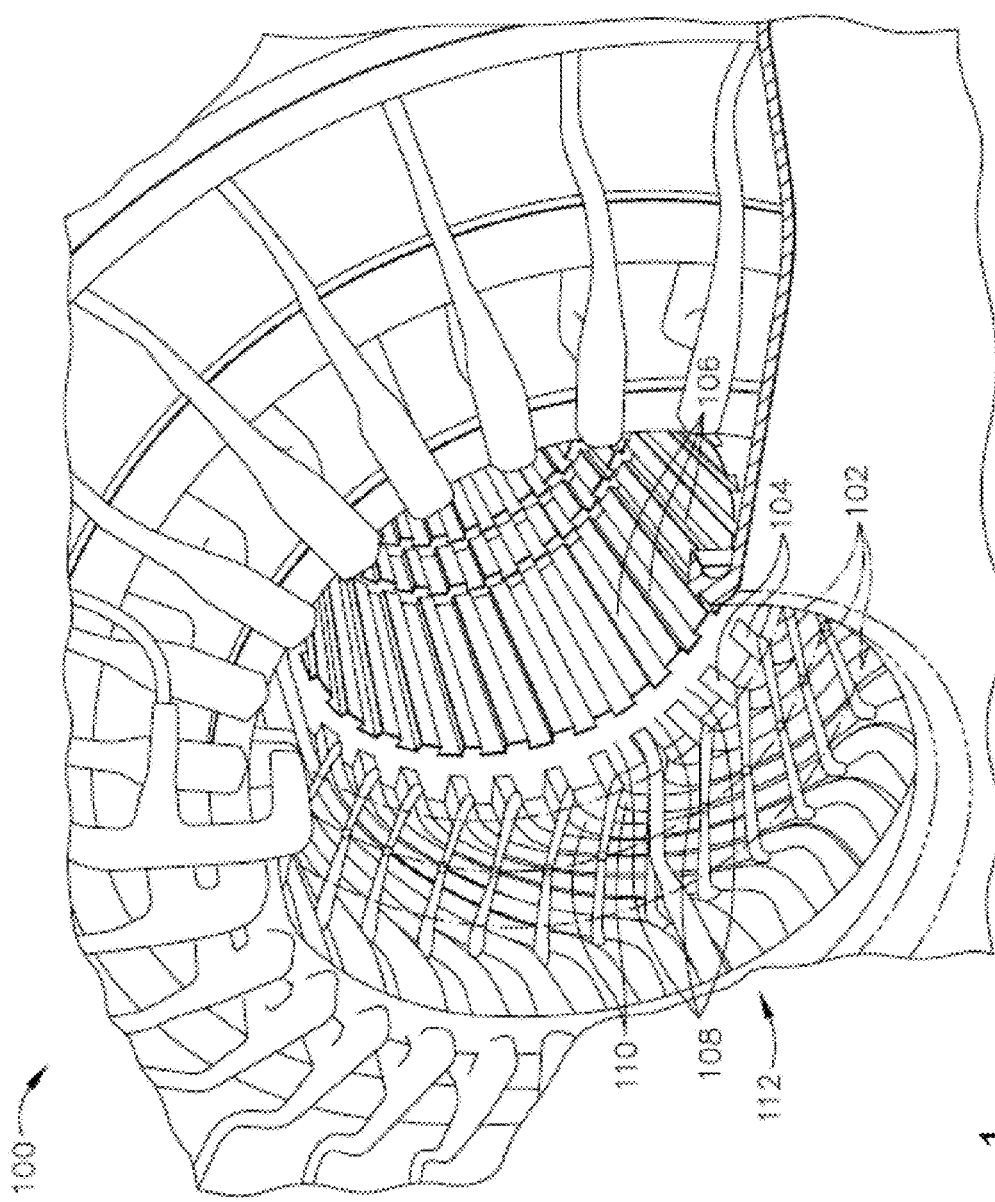
FIG. 1 is a schematic illustration of stator bars extending through a stator core of an electrical generator.

FIG. 1 is a perspective end view of an exemplary generator 100. A rotor 102 is transparently represented by dashed lines. A plurality of stator bar windings 104 are positioned in slots 106 defined around an inner circumference of a stator core 108. More specifically, each stator bar winding 104 includes at least one circumferential bend 110 defined between a turbine end 112 and a generator end (not shown) of each winding 104. Bends 110 are one portion of each stator bar winding 104 that need to be bent into specific shapes. In the exemplary embodiment, stator bar windings 104 are formed from a plurality of flat bar conductors or stator bars that are coupled together prior to form to a pre-determined winding path through winding 104. In one embodiment, the stator bars are fabricated from copper. The conductor ends are electrically connected together to form each winding of generator 100.

Figure 2:
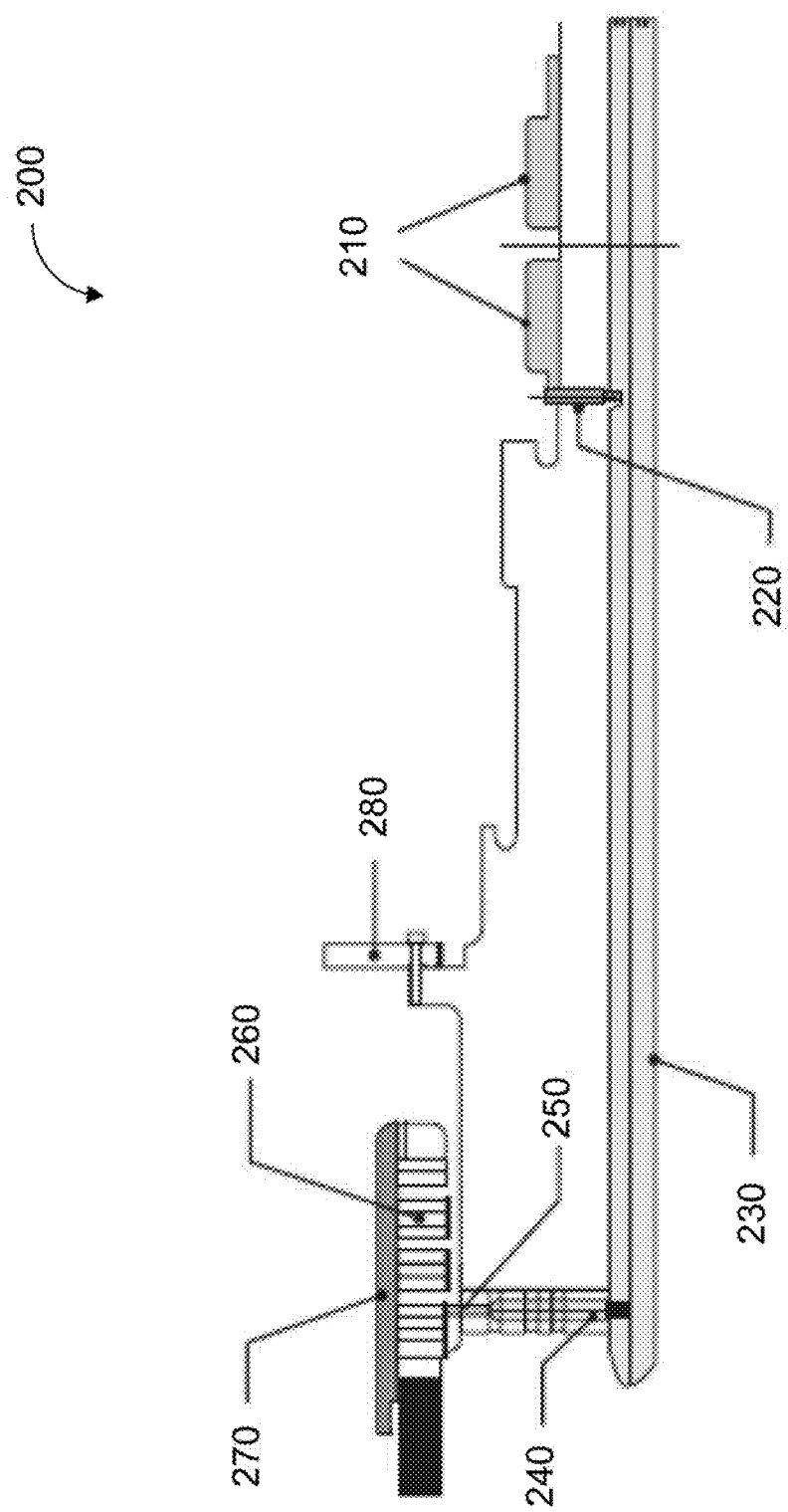
FIG. 2 is a partial, cross-sectional illustration of the collector end of a generator rotor.

FIG. 2 is a partial, cross-sectional illustration of the collector end 200 of a generator rotor. The collector end includes the collectors 210, collector terminal 220, bore copper 230, main terminal 240, main leads 250, field coil end windings 260 and retaining ring 270. An axial fan 280 may also be used to facilitate cooling. The main leads 250 are an example of one conductor that must be bent to specific shapes and bent in specific locations. In the past, many tools and jigs were required to obtain the specific shapes and bends required in specific generators. The main leads, and other conductors used in the generator 100, may be comprised of one or more strands of conductors (e.g., copper).

Figure 3:
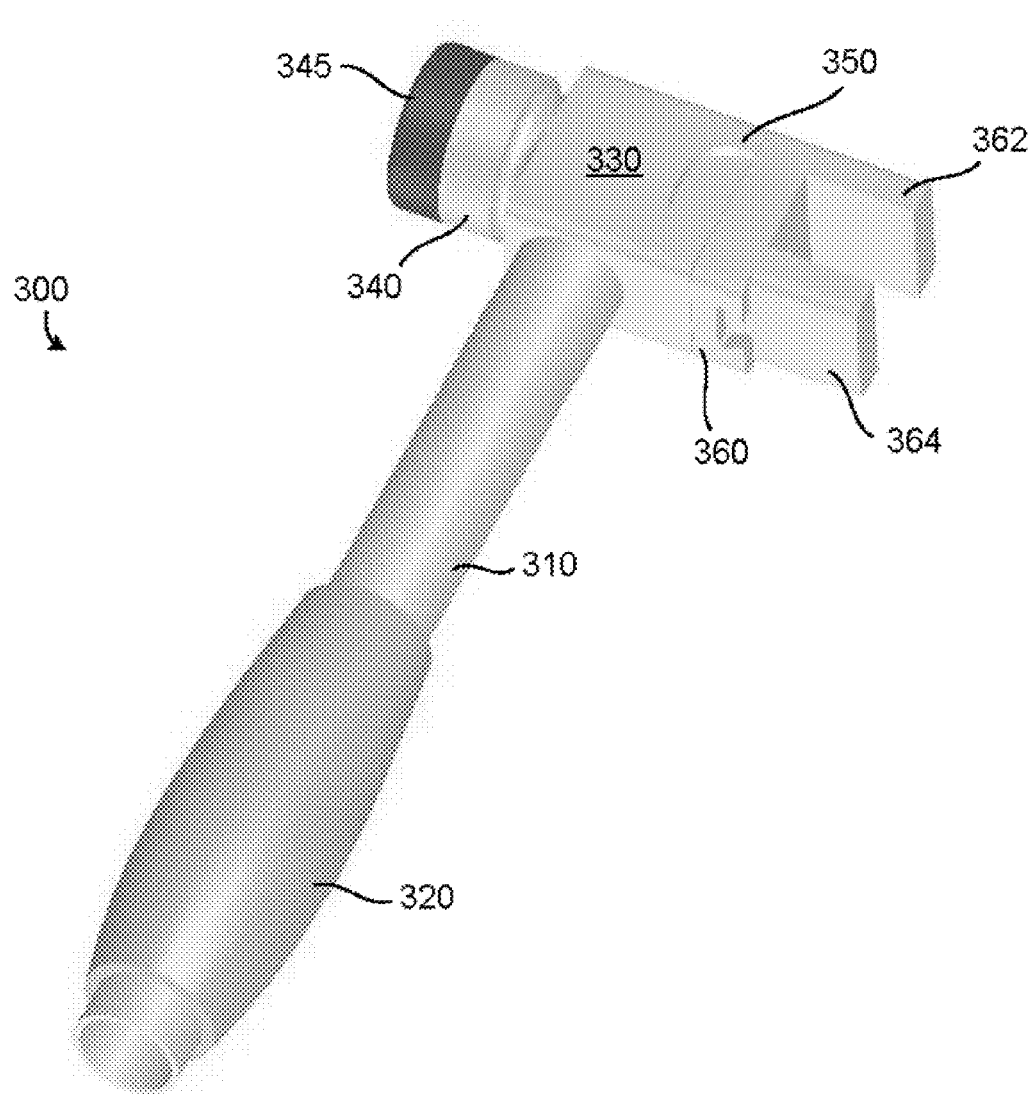
FIG. 3 is an isometric illustration of a tool for bending, shaping and aligning conductors in a dynamoelectric machine, according to an aspect of the present invention.

FIG. 3 is an isometric illustration of a tool 300 that can be used for bending, shaping and aligning leads in a dynamoelectric machine, such as a generator, according to one aspect of the present invention. The tool can take the general shape of a hammer and includes a handle 310, grip 320 and head 330. The handle can take any shape desired, and may be substantially tubular in shape with a cylindrical cross section. In one aspect, the handle could be formed by a suitable length of pipe formed of steel or aluminum. The grip 320 may be elastomeric or formed of a rubber-like material, and may be formed in an ergonomical shape to facilitate gripping by an operator. However, any length, material and shape for handle 310 and/or grip 320 may be employed, as desired by the specific application.

The head 330 includes a striking element 340 which may include a replaceable striking element 345. The striking element 345 can be replaced if it becomes worn or damaged, and can be formed of a polymeric material which is designed to reduce localized impact to the relatively soft conductors (e.g., copper) in the generator. The opposite side of head 330 includes an interchangeable tool socket 350 that is designed to accept tool insert 360. The tool inserts can include many differently shaped tools which can be used for many different bending and shaping tasks.

The tool insert 360, as shown in FIG. 3, includes two substantially parallel plates 362 and 364. At least one of these plates (e.g., 364) is adjustable to vary the distance between plate 362. In one aspect of the present invention, plate 362 can be fixed and plate 364 includes a trapezoidal projection which fits into a dovetail shaped groove in tool insert 360. A set screw or pin can be used to lock the plate 364 in the desired position.

Figure 4:
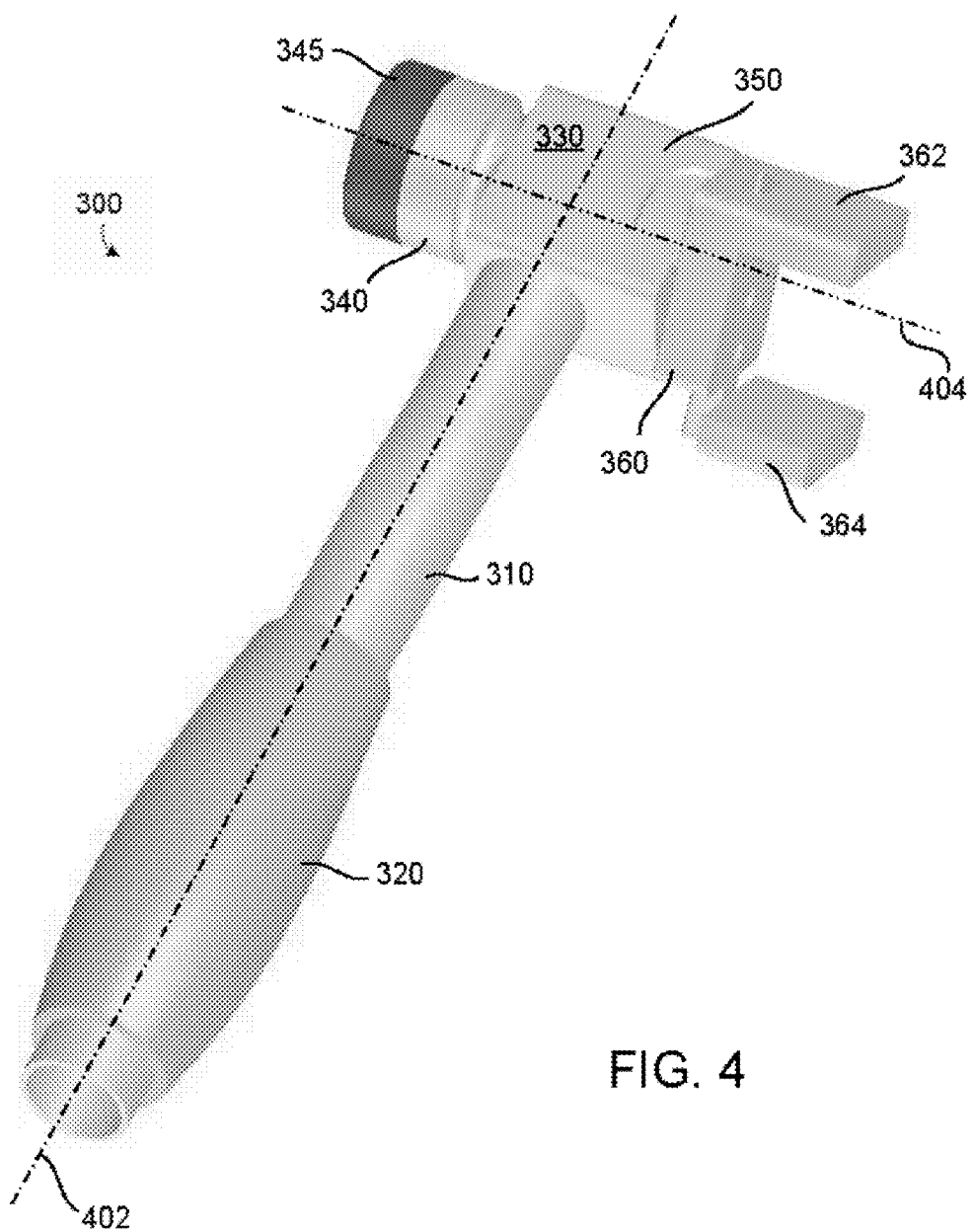
FIG. 4 is an isometric illustration of a tool for bending, shaping and aligning conductors in a dynamoelectric machine, according to an aspect of the present invention.

FIG. 4 illustrates an isometric view of tool 300 where the tool insert 360 has been rotated to a new position. The handle can be oriented along a handle axis 402 which extends along the center of the handle. The head can be generally oriented along a head axis 404, which is generally orthogonal to the handle axis 402 and centered on the point of rotation within socket 350. The tool insert 360 can rotate within the socket 350 in a circumferential direction about head axis 404. A plurality of stops (to be described later) enable the operator to lock the insert 360 in a plurality of angular positions.

The plates 362, 364 can be used to closely fit against a conductor so that an operator can make a bend at a specific point along the conductor. The operator places the conductor between the two plates 362, 264, and then applies force to handle 310 to bend the conductor the desired amount. An advantage to the adjustable jaws or plates 362, 364 and the pivotable or rotatable insert 360, is that the operator can adjust the plates to fit snugly around a conductor and can set the most suitable angular position to obtain leverage when bending and/or shaping conductors. The pivoting or rotating tool insert 360 is very advantageous when compared to other known non-adjustable tools.

Figure 5:
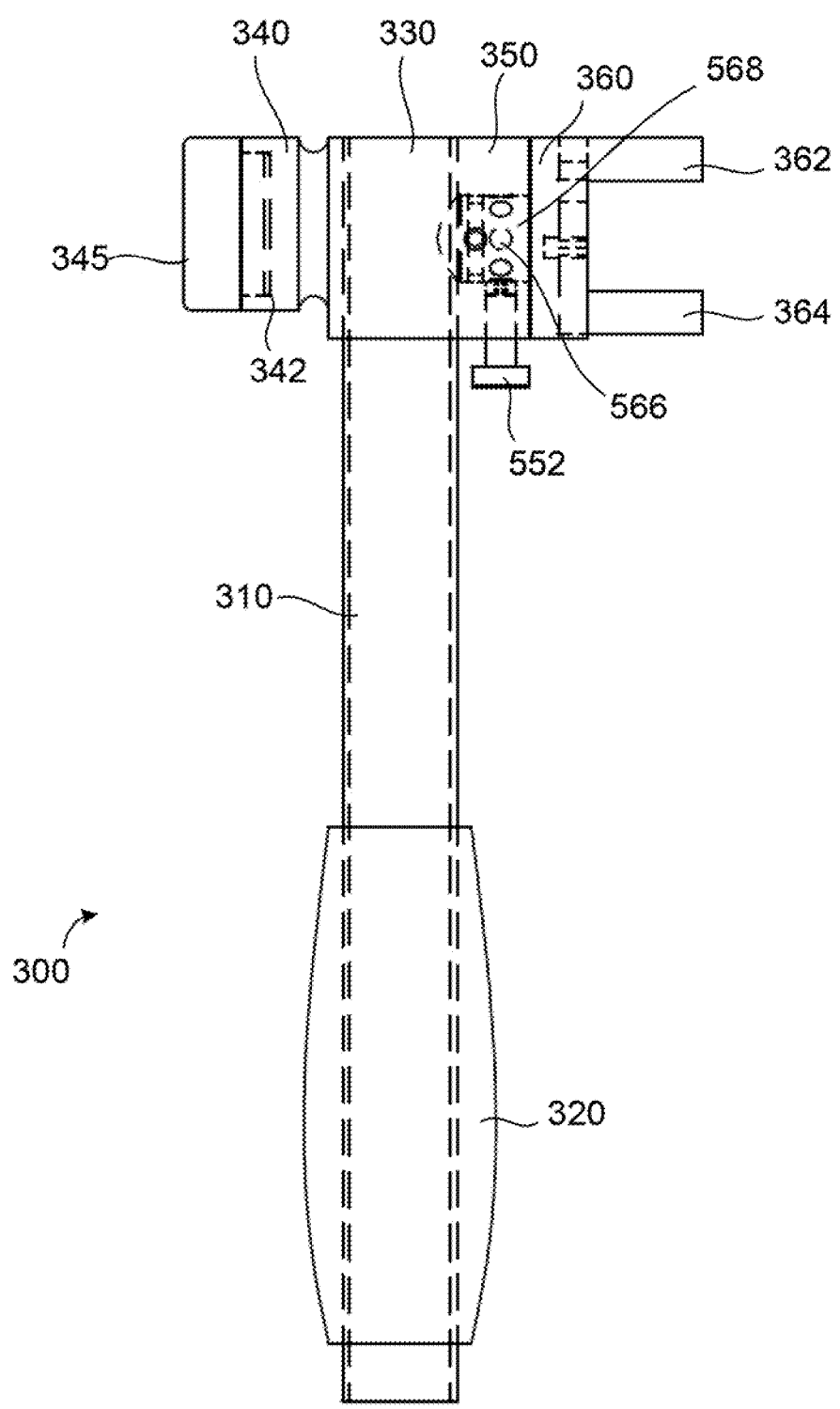
FIG. 5 is a cross-sectional illustration of a tool for bending, shaping and aligning conductors in a dynamoelectric machine, according to an aspect of the present invention.

FIG. 5 illustrates a cross-sectional view of the tool 300. The striking element 345 can include a recessed socket 342 that can accept the replaceable striking element 345. On the opposite side of the head, the interchangeable tool socket 350 is formed by a generally cylindrical recess within a portion of head 330. The socket 350 incorporates an opening for a fastener 552 that can be locked into place. As non-limiting examples, the fastener 552 could be a screw with threads that engage complementary threads in the opening in socket 350, or the fastener 552 could be a spring biased plunger designed to retract towards the center of socket 350.

The fastener 552 can engage stops 566 placed around the circumference of a generally cylindrical projection 568 on tool insert 360. The stops may be flat regions, concave regions or any other suitable regions that engage with the end of fastener 552 to lock the tool insert 360 at any of a number of angular positions.

In operation, an operator can use the opening in the bottom (near the end of grip 320) of the handle 310 to fit over a conductor. The operator can then apply force to the handle 310 and/or head 330 to bend or shape the conductor the desired amount. The striking element 345 may also be used to apply impact forces to conductors or other elements to obtain the desired results. The tool insert 360 can be placed about a portion of a conductor and the operator can then apply force to the handle 310 to bend or shape the conductor the desired amount.

In some applications it is difficult to obtain the desired angle of handle 310 to apply the desired amount of force. By releasing the fastener 552, the tool insert 360 can be rotated to a plurality of axial positions. When the desired angular position is achieved, the operator locks the fastener 552 against one of the stops 566. The conductor can now be bent or shaped the desired amount by applying force to handle 310.

Figure 6:
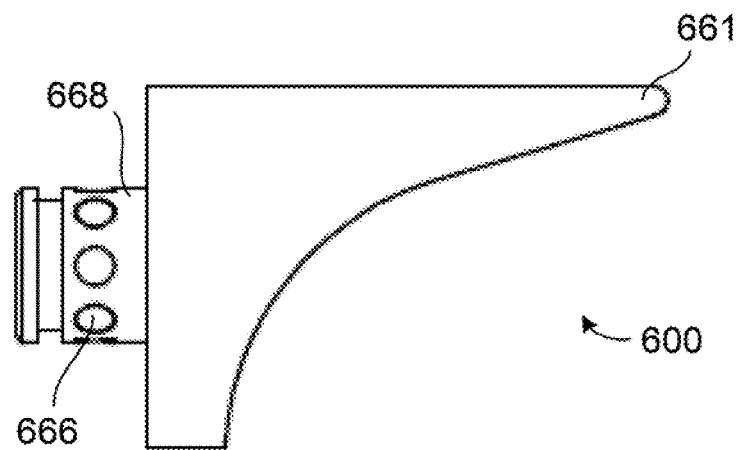
FIG. 6 is a cross-sectional illustration of a tool insert for bending, shaping and aligning conductors that can be used with the tool of FIG. 3, according to an aspect of the present invention.

FIG. 6 illustrates a cross-sectional view of another tool insert in the shape of a pick 600. The pick 600 includes a generally cylindrical projection 668 that includes a plurality of stops 666. The cylindrical projection 668 fits into socket 350 of tool 300. The pick end 661 can be used to pry apart individual strands of multi-strand conductors.

Figure 7:
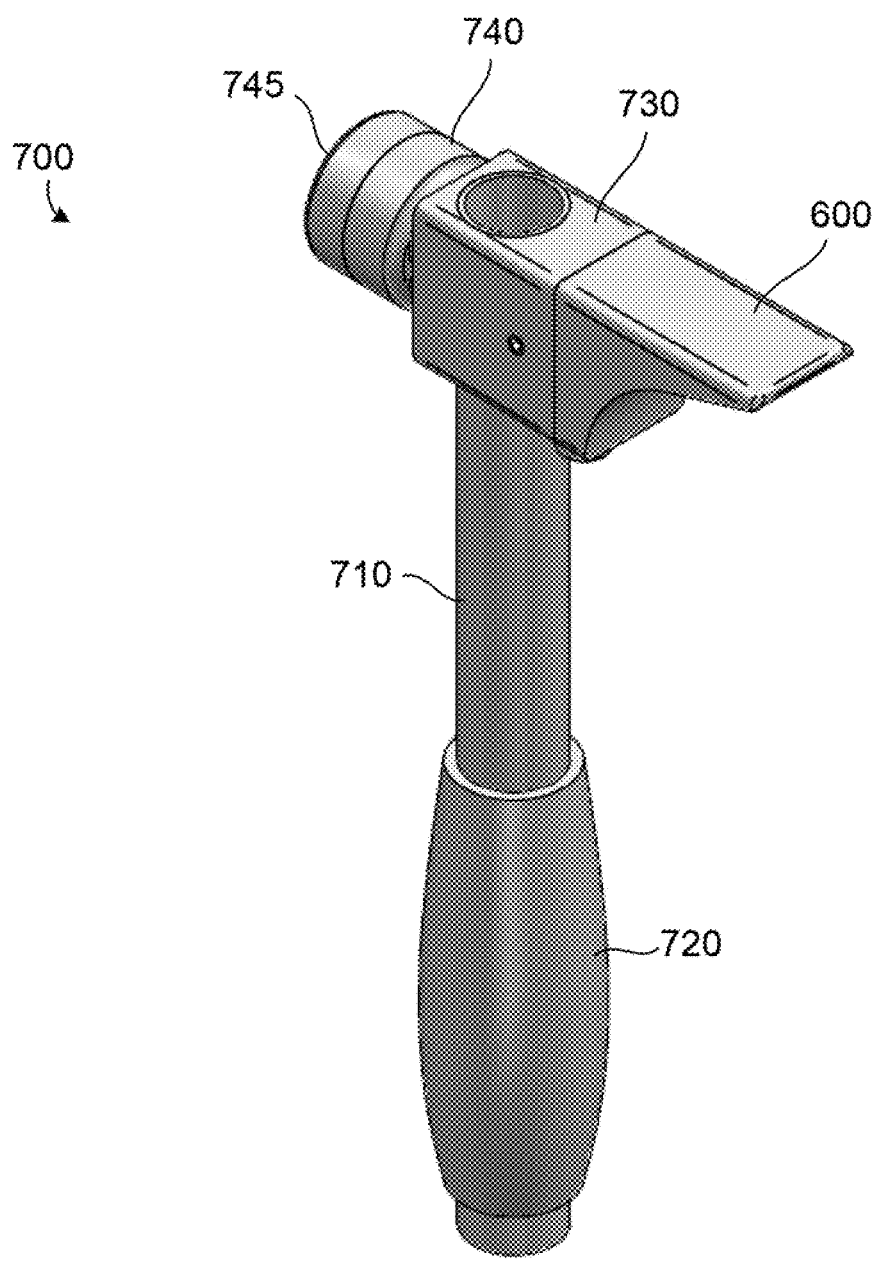
FIG. 7 is an isometric illustration of a tool for bending, shaping and aligning conductors incorporating the tool insert of FIG. 6, according to an aspect of the present invention.

FIG. 7 illustrates an isometric view of tool 700 having pick 600 installed. The tool 700 includes handle 710, grip 720 and head 730. The head 730 includes a striking element 740 which may include a replaceable striking element 745. The striking element 745 can be replaced if it becomes worn or damaged, and can be formed of a polymeric material which is designed to reduce localized impact to the relatively soft conductors (e.g., copper) in the generator. The opposite side of head 730 includes an interchangeable tool socket that is designed to accept tool insert 600.

Figure 8:
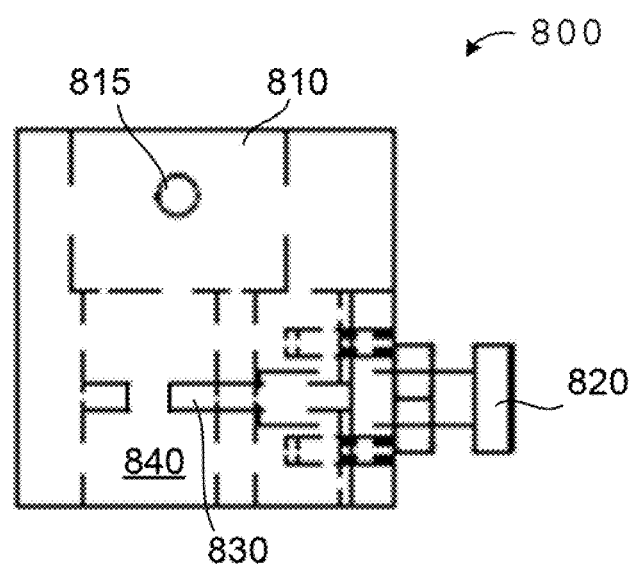
FIG. 8 is a cross-sectional illustration of a wire bend extension that can be used with the tool of FIG. 3, according to an aspect of the present invention.

FIG. 8 illustrates a cross-sectional view of a wire bend extension 800. The wire bend extension includes an opening 810 sized to accept the insertion of a portion of handle 310. A locking mechanism 815 locks the wire bend extension to the handle, and may include fasteners, a pin or a spring biased spherical bearing. An adjustable screw 820 is connected to a clamping element 830 that can be extended into opening 840. The clamping element can be a generally rectangular piece of steel or aluminum, or any other suitable shaped element capable of clamping onto a conductor. In use, an operator can insert a wire or conductor within opening 840. The screw 820 can be adjusted to force clamping element 830 against the conductor to lock the tool 300 to a specific location on the conductor. An operator can the apply force to bend or shape the conductor at the location where clamping element 830 meets the conductor.

Figure 9:
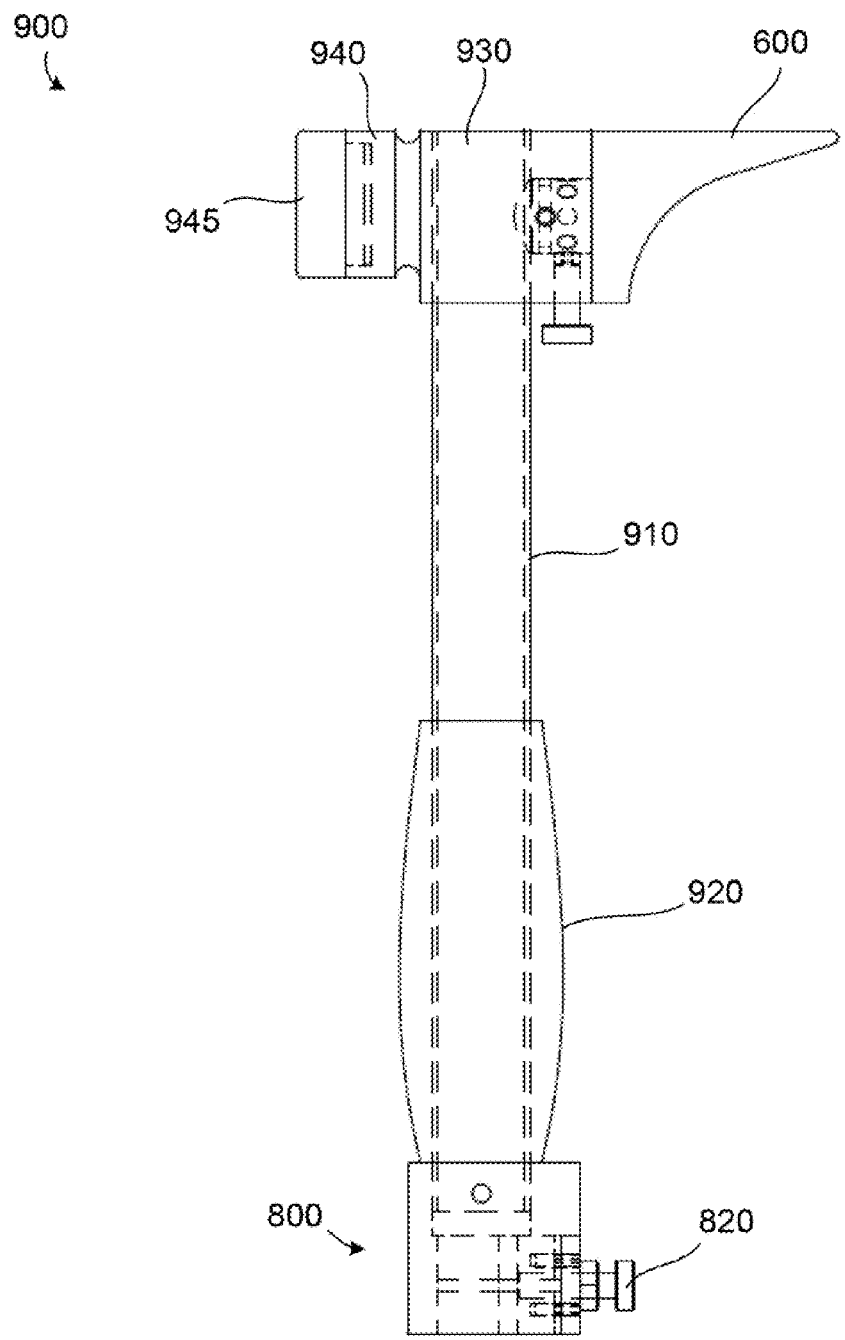
FIG. 9 is an isometric illustration of a tool for bending, shaping and aligning conductors incorporating the wire bend extension of FIG. 8, according to an aspect of the present invention.

FIG. 9 illustrates a cross-sectional view of tool 900 incorporating pick 600 and wire bend extension 800. The tool 900 includes handle 910, grip 920 and head 930. The head 930 includes a striking element 940 which may include a replaceable striking element 945. The striking element 945 can be replaced if it becomes worn or damaged, and can be formed of a polymeric material which is designed to reduce localized impact to the relatively soft conductors (e.g., copper) in the generator. The opposite side of head 930 includes an interchangeable tool socket that is designed to accept tool insert 600.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A tool for applying a load to one or more conductors in a dynamo electric machine, the tool comprising:

an elongate, substantially tubular handle having an opening at a first end, and a second end opposed to said first end, the handle having a handle axis;

a head connected to the second end of the handle, the head comprising a striking surface for applying impact loads, and an interchangeable tool socket located opposite to the striking surface, the head having a head axis oriented substantially orthogonal to the handle axis;

wherein the interchangeable tool socket is configured to accept one of a plurality of tool inserts and each of the tool inserts are configured to be rotated generally around the head axis and locked in at least one position by the interchangeable tool socket so that the angle of each tool insert can be adjusted, and wherein each of the plurality of tool inserts comprise a generally cylindrical projection configured to fit into the interchangeable tool socket, the generally cylindrical projection comprising multiple stops that enable each of the tool inserts to be locked in multiple angular positions about the head axis, and wherein the plurality of tool inserts comprise at least one of a U-shaped cable bender, and a pick, and the U-shaped cable bender comprises two substantially parallel tangs, wherein at least one of the tangs is adjustable so that the adjustable tang can be moved in a direction substantially orthogonal to the head axis and locked in multiple positions.

2. The tool of claim 1, wherein the tool is used for applying bending or impact loads.

3. The tool of claim 1, wherein the interchangeable tool socket comprises a locking mechanism that interacts with one of the tool inserts to lock each tool insert in the interchangeable tool socket.

4. The tool of claim 3, wherein the locking mechanism is a threaded fastener that is configured to be manually rotated to lock or release the tool insert.

5. The tool of claim 3, wherein the locking mechanism is a spring-biased plunger element that is configured to be manipulated to lock or release the tool insert.

6. The tool of claim 1, wherein the stops are concave regions in the generally cylindrical projection.

7. The tool of claim 1, wherein the stops are substantially flat regions in the generally cylindrical projection.

8. The tool of claim 1, wherein the elongate, substantially tubular handle is substantially hollow to allow the handle to be placed over at least one conductor so that a bending load may be applied to the at least one conductor via the elongate, substantially tubular handle.

9. The tool of claim 8, wherein the elongate, substantially tubular handle further comprises:

a wire bend extension connected to the first end of the elongate, substantially tubular handle, the wire bend extension comprising a hollow passageway oriented substantially orthogonal to the handle axis, the hollow passageway configured to fit over at least one conductor.

10. The tool of claim 9, the wire bend extension comprising an adjustable clamping element that can be extended into the hollow passageway and locked in position via an adjustable locking fastener;

wherein the adjustable clamping element functions to securely lock the tool to a position on the at least one conductor.

11. The tool of claim 10, wherein the adjustable locking fastener is at least one of a screw and a bolt.

12. A tool for applying a bending or impact load to one or more conductors in a dynamoelectric machine, the tool comprising:

an elongate, substantially tubular handle having an opening at a first end, and a second end opposed to said first end, the handle having a handle axis, the elongate, substantially tubular handle is substantially hollow to allow the handle to be placed over at least one conductor so that a bending load may be applied to the at least one conductor via the elongate, substantially tubular handle, a wire bend extension connected to the first end, the wire bend extension comprising a hollow passageway oriented substantially orthogonal to the handle axis, the hollow passageway configured to fit over at least one conductor, and an adjustable clamping element that can be extended into the hollow passageway and locked in position via an adjustable locking fastener, wherein the adjustable clamping element functions to securely lock the tool to a position on the at least one conductor;

a head connected to the second end of the handle, the head comprising a striking surface for applying impact loads, and an interchangeable tool socket located opposite to the striking surface, the head having a head axis oriented substantially orthogonal to the handle axis;

wherein the interchangeable tool socket is configured to accept one of a plurality of tool inserts and each of the tool inserts is configured to be rotated generally around the head axis and locked in at least one position by the interchangeable tool socket so that the angle of each of the tool inserts can be adjusted, and wherein each of the plurality of tool inserts comprise a generally cylindrical projection configured to fit into the interchangeable tool socket, the generally cylindrical projection comprising multiple stops that enable each tool insert to be locked in multiple angular positions about the head axis, and wherein the stops are at least one of concave regions and flat regions.

13. The tool of claim 12, wherein the interchangeable tool socket comprises a locking mechanism that interacts with each of the tool inserts to lock each of the tool inserts in the interchangeable tool socket, and wherein the locking mechanism is at least one of a threaded fastener that can be manually rotated to lock or release the tool insert, and a spring-biased plunger element that can be manipulated to lock or release each of the tool inserts.

14. The tool of claim 12, wherein the plurality of tool inserts comprise at least one of:

a U-shaped cable bender, and a pick.

15. A tool for applying a load to at least one conductor in a dynamo electric machine, the tool comprising:

an elongate, substantially tubular handle having an opening at a first end, and a second end opposed to said first end, the handle having a handle axis, the elongate, substantially tubular handle is substantially hollow to allow the handle to be placed over the at least one conductor so that a bending load may be applied to the at least one conductor via the elongate, substantially tubular handle, and wherein the elongate, substantially tubular handle further comprises a wire bend extension connected to the first end of the elongate, substantially tubular handle, the wire bend extension comprising a hollow passageway oriented substantially orthogonal to the handle axis, the hollow passageway configured to fit over at least one conductor;

a head connected to the second end of the handle, the head comprising a striking surface for applying impact loads, and an interchangeable tool socket located opposite to the striking surface, the head having a head axis oriented substantially orthogonal to the handle axis;

wherein the interchangeable tool socket is configured to accept one of a plurality of tool inserts and each of the tool inserts are configured to be rotated generally around the head axis and locked in at least one position by the interchangeable tool socket so that the angle of each tool insert can be adjusted.

16. The tool of claim 15, the wire bend extension comprising an adjustable clamping element that can be extended into the hollow passageway and locked in position via an adjustable locking fastener; and wherein the adjustable clamping element functions to securely lock the tool to a position on the at least one conductor.

17. The tool of claim 16, wherein the adjustable locking fastener is at least one of a screw and a bolt.

18. A tool for applying a bending or impact load to at least one conductor in a dynamoelectric machine, the tool comprising:

elongate, substantially tubular handle having an opening at a first end, and a second end opposed to said first end, the handle having a handle axis, wherein the elongate, substantially tubular handle is substantially hollow to allow the handle to be placed over the at least one conductor so that a bending load may be applied to the at least one conductor via the elongate, substantially tubular handle, and wherein the elongate, substantially tubular handle further comprises a wire bend extension connected to the first end of the elongate, substantially tubular handle, the wire bend extension comprising a hollow passageway oriented substantially orthogonal to the handle axis, the hollow passageway configured to fit over the at least one conductor, and an adjustable clamping element that can be extended into the hollow passageway and locked in position via an adjustable locking fastener; and wherein the adjustable clamping element functions to securely lock the tool to a position on the at least one conductor;

a head connected to the second end of the handle, the head comprising a striking surface for applying impact loads, and an interchangeable tool socket located opposite to the striking surface, the head having a head axis oriented substantially orthogonal to the handle axis; and wherein the interchangeable tool socket is configured to accept one of a plurality of tool inserts and each of the tool inserts is configured to be rotated generally around the head axis and locked in at least one position by the interchangeable tool socket so that the angle of each of the tool inserts can be adjusted.

* * * * *